United States Patent
Nakata et al.

(10) Patent No.: US 8,169,512 B2
(45) Date of Patent: May 1, 2012

(54) VIDEO SIGNAL PROCESSING CIRCUIT, IMAGING DEVICE AND VIDEO SIGNAL PROCESSING METHOD

(75) Inventors: Hiroyuki Nakata, Musashimurayama (JP); Takashi Itoh, Hamura (JP); Motoyuki Kashiwagi, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 85 days.

(21) Appl. No.: 12/816,462

(22) Filed: Jun. 16, 2010

(65) Prior Publication Data

US 2010/0321550 A1  Dec. 23, 2010

(30) Foreign Application Priority Data

Jun. 19, 2009  (JP) .................................. 2009-146822

(51) Int. Cl.
*H04N 5/335*  (2011.01)
*H04N 3/14*  (2006.01)

(52) U.S. Cl. ........................................ 348/245; 348/312
(58) Field of Classification Search .................. 348/245, 348/294, 302, 308, 311, 312, 241
See application file for complete search history.

(56) References Cited

U.S. PATENT DOCUMENTS

| | | | | |
|---|---|---|---|---|
| 5,555,021 A * | 9/1996 | Igarashi | ........................ | 348/241 |
| 7,129,985 B1 * | 10/2006 | Koizumi et al. | .............. | 348/308 |
| 7,133,074 B1 * | 11/2006 | Brehmer et al. | .............. | 348/308 |
| 7,619,669 B2 * | 11/2009 | Barna et al. | .................... | 348/283 |
| 2007/0035650 A1 * | 2/2007 | Suzuki | .......................... | 348/312 |

FOREIGN PATENT DOCUMENTS

| | | |
|---|---|---|
| JP | 2001-211380 A | 8/2001 |
| JP | 2003-046878 A | 2/2003 |
| JP | 2007-036457 A | 2/2007 |
| JP | 2008-289136 A | 11/2008 |

OTHER PUBLICATIONS

Japanese Office Action dated Apr. 12, 2011 (and English translation thereof) in counterpart Japanese Application No. 2009-146822.

* cited by examiner

*Primary Examiner* — Jason Whipkey
(74) *Attorney, Agent, or Firm* — Holtz, Holtz, Goodman & Chick, PC

(57) ABSTRACT

A digital still camera includes an amplification circuit, a timing generator, sample hold circuits, a differential amplifier, an analog/digital conversion circuit and a control unit. The generator generates a first-pulse signal and a second-pulse signal at different timings. The circuits sample analog video signals outputted from the amplification circuit at timings when the first-pulse signal and second-pulse signal, respectively, are provided and hold levels of the analog video signals. The amplifier acquires a difference between the levels of the analog video signals. The circuit obtains a digital video signal corresponding to the analog video signal on the basis of the difference. The unit changes the timings to provide the first- and second-pulse signals to the first- and second-sample hold circuits, respectively, and a bias current depending on the driving period.

9 Claims, 4 Drawing Sheets

VIDEO SIGNAL PROCESSING CIRCUIT, IMAGING DEVICE AND VIDEO SIGNAL PROCESSING METHOD

CROSS-REFERENCE TO RELATED APPLICATION

This application claims the benefit of Unexamined Japanese Patent Application No. 2009-146822, the entire disclosure of which is incorporated by reference herein.

FIELD

The present invention relates to a video signal processing circuit, an imaging device and a video signal processing method.

BACKGROUND

Conventionally, an imaging device such as a digital still camera is mounted with an analog signal processing unit that performs analog signal processing to convert analog video signals outputted from an imaging element represented by a charge-coupled device (CCD) and a complementary metal oxide semiconductor (CMOS) sensor into digital video signals.

Related to this conventional analog signal processing unit, Unexamined Japanese Patent Application Publication No. 2008-289136 discloses the first technique to stop analog signal processing by stopping clock signals to the analog signal processing unit while power supply to the analog signal processing unit continues during a blanking interval.

Unexamined Japanese Patent Application Publication No. 2008-289136 also discloses the second technique to stop analog signal processing by shutting off power supply to a portion of the analog signal processing unit during a blanking interval.

Power consumption of the device can be reduced by stopping the function of the analog signal processing unit during a blanking interval on the basis of these first and second techniques.

However, according to the first technique of the aforementioned patent literature, although power consumption can be reduced by stopping clock signals to the analog signal processing unit thereby stopping analog signal processing during a blanking interval, power consumption cannot be reduced while analog signal processing is performed. According to the second technique of the aforementioned patent literature, although power consumption can be reduced by shutting off power supply to a portion of the analog signal processing unit to stop analog signal processing during a blanking interval, power consumption cannot be reduced while analog signal processing is performed.

SUMMARY

The objective of the present invention is to provide a video signal processing circuit, an imaging device and a video signal processing method that can reduce power consumption even while analog signal processing is performed.

In order to achieve the aforementioned objective, a video signal processing circuit in accordance with the first aspect of the present invention is characterized by including: an amplifier that amplifies an analog video signal, the analog video signal being sequentially outputted in pixel unit from an imaging element depending on a driving period, a level of the analog video signal changing depending on the quantity of electric charge accumulating in a pixel; a timing generator that outputs a first-pulse signal and a second-pulse signal at different timings; a first-sample hold circuit that samples an analog video signal outputted from the amplifier at a timing when the first-pulse signal is provided and holds a level of the analog video signal; a second-sample hold circuit that samples an analog video signal outputted from the amplifier at a timing when the second-pulse signal is provided and holds a level of the analog video signal; an acquirer that acquires a difference between the levels of the analog video signal held at the first-sample hold circuit and the level of the analog video signal held at the second-sample hold circuit; an analog/digital converter that obtains a digital video signal corresponding to the analog video signal on the basis of the difference acquired by the acquirer; and a changer that changes the timing when the first-pulse signal is provided to the first-sample hold circuit, the timing when the second-pulse signal is provided to the second-sample hold circuit and a bias current depending on the driving period.

To achieve the aforementioned objective, an imaging device in accordance with the second aspect of the present invention is characterized by including: the video signal processing circuit in accordance with the first aspect of the present invention; a performer that performs a predetermined processing on a digital video signal obtained by an analog/digital converter; and a recorder that records resulting data on a recording medium.

To achieve the aforementioned objective, a video signal processing method in accordance with the third aspect of the present invention is characterized by including: an amplification step to amplify an analog video signal by a bias current, the analog video signal being sequentially outputted in pixel unit from an imaging element depending on a driving period, a level of the analog video signal changing depending on a quantity of electric charge accumulating in the pixel; a timing generation step to generate a first-pulse signal and a second-pulse signal at different timings; a first-sample hold step to sample an analog video signal outputted at the amplification step at a timing when the first-pulse signal is provided and hold a level of the analog video signal; a second-sample hold step to sample an analog video signal outputted at the amplification step at a timing when the second-pulse signal is provided and hold a level of the analog video signal; an acquisition step that acquires the difference between the level of the analog video signal held at the first-sample hold step and the level of the analog video signal held at the second-sample hold step; and an analog/digital conversion step to obtain a digital video signal corresponding to the analog video signal on the basis of the difference acquired at the acquisition step; wherein the timing to generate the first-pulse signal, the timing to generate the second-pulse signal and a bias current are changed depending on the driving period.

BRIEF DESCRIPTION OF THE DRAWINGS

A more complete understanding of this application can be obtained when the following detailed description is considered in conjunction with the following drawings, in which.

DETAILED DESCRIPTION

Preferred Embodiments of the present invention will be described in detail with reference to drawings.

Figure 1:
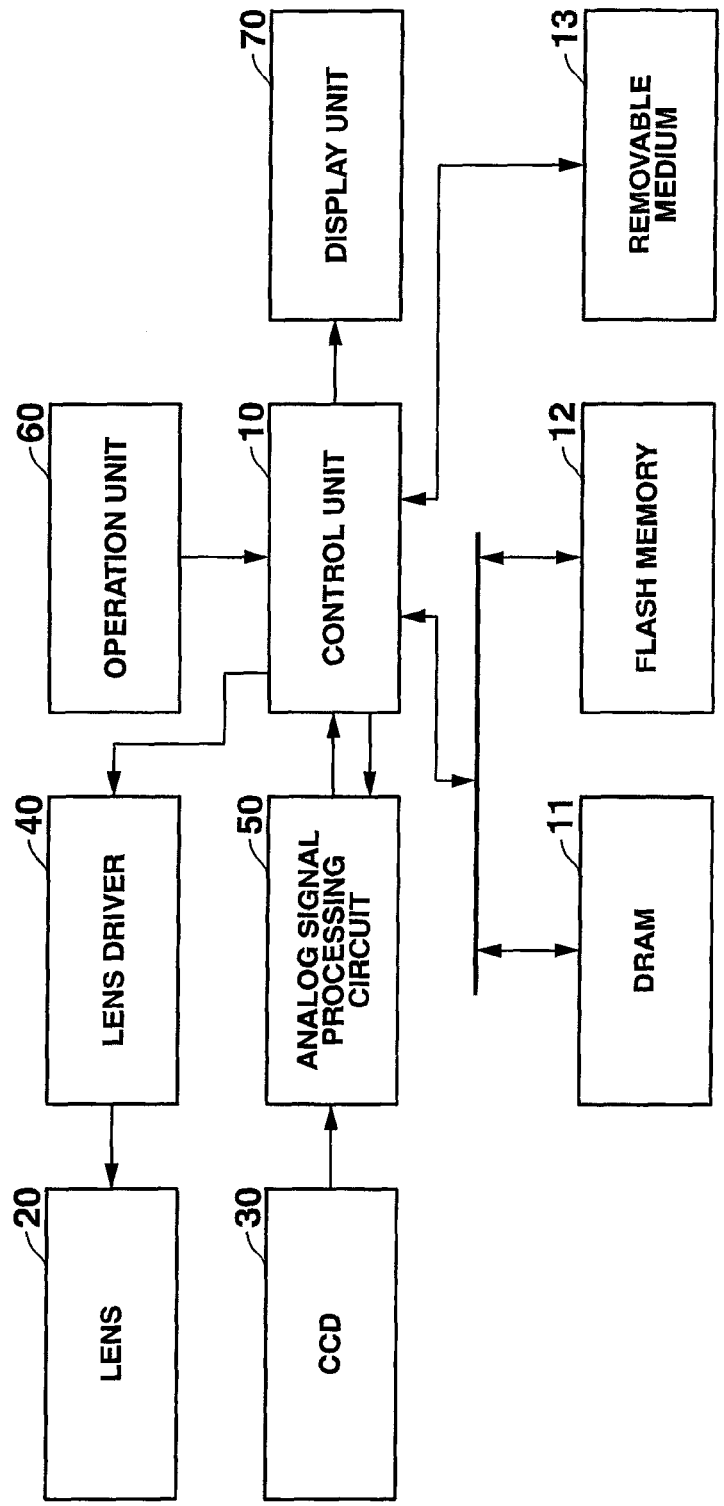
FIG. 1 is a block diagram illustrating a digital still camera according to an embodiment of the present invention.

FIG. 1 is a block diagram illustrating a digital still camera according to an embodiment of the present invention.

A digital still camera as an imaging device includes: a control unit 10 to control the entire device; a lens 20; a charge coupled device (CCD) 30 as an imaging element; a lens driver 40; an analog signal processing circuit 50 as a video signal processing circuit; an operation unit 60; and a display unit 70.

The operation unit 60 includes a shutter button and a switch that are connected to the control unit 10 and allows for input from a user.

The display unit 70 includes a liquid crystal display, displays a captured image and performs the display to assist a user's operation.

The control unit 10 is composed of a central processing unit (CPU). To the control unit 10 a dynamic random access memory (DRAM) 11 used to perform each processing step and a flash memory 12 that stores an image data and the like are connected. In addition, other removal media 13 such as a mini disc (MD) and a compact disc recordable (CD-R) may be connected to the control unit 10 and made to function in a similar way as the flush memory 12.

The lens 20 collects light on a sensor face of the CCD 30 to produce an image. The lens driver 40 adjusts a position of the lens 20 relative to the CCD 30 according to the instruction from the control unit 10.

The CCD 30 photoelectric-converts the captured image provided through the lens 20 to accumulate a quantity of electric charge corresponding to the quantity of light received for each pixel and sequentially outputs an analog video signal for each pixel.

To an output terminal of the CCD 30 the analog signal processing circuit 50 is connected.

Figure 2:
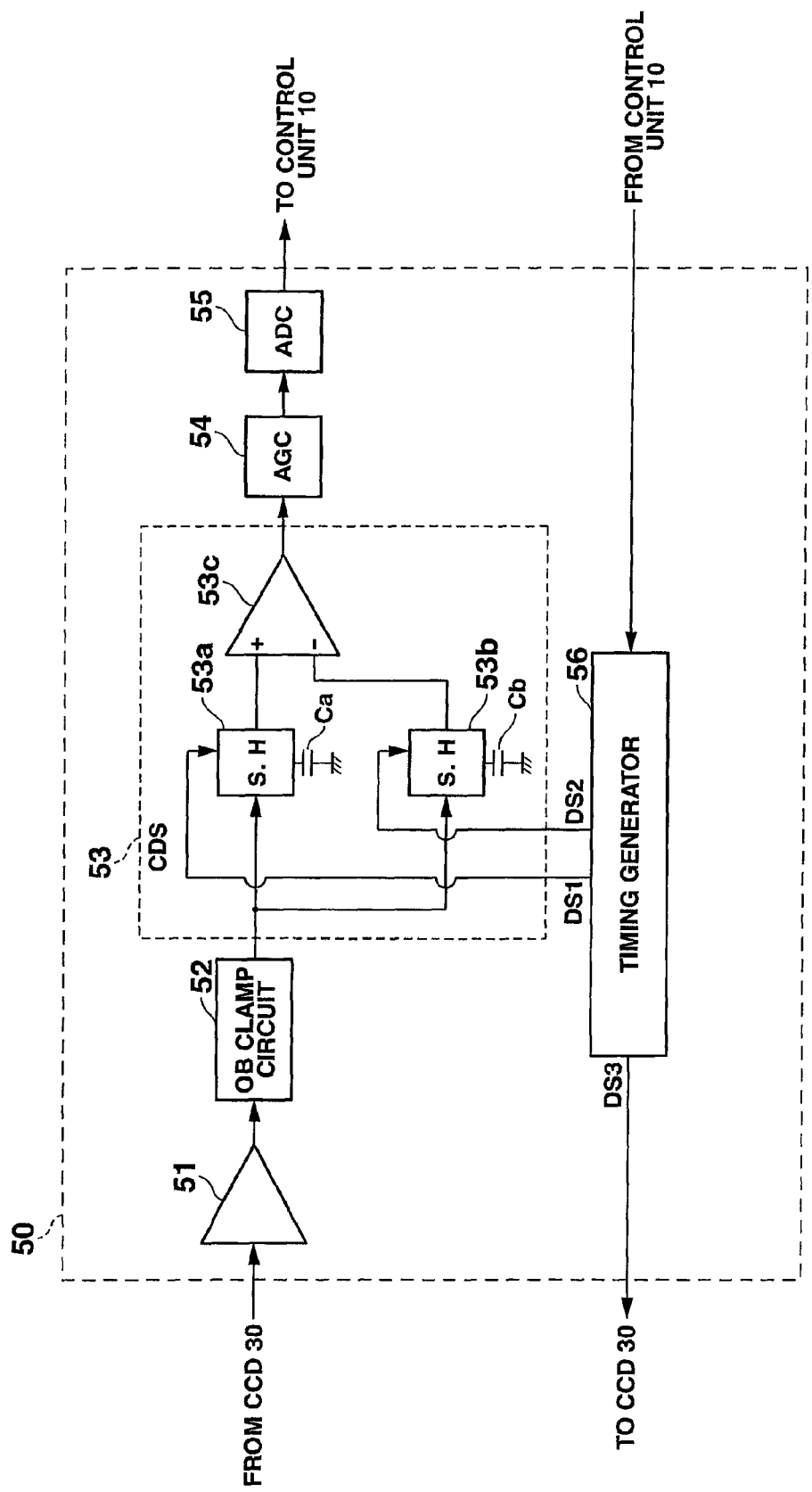
FIG. 2 is a brief block diagram illustrating an analog signal processing circuit.

FIG. 2 is a brief block diagram illustrating the analog signal processing circuit 50.

The analog signal processing circuit 50 is a circuit that converts an analog video signal from the CCD 30 to a digital video signal. The analog signal processing circuit 50 includes: an amplification circuit 51 connected to the CCD 30; an optical black (OB) clamp circuit 52 connected to the output side of the amplification circuit 51; a correlated double sampling circuit (CDS) 53; an auto gain control circuit (AGC) 54; an analog/digital conversion circuit (ADC) 55; and a timing generator 56.

The amplification circuit 51 amplifies an analog video signal from the CCD 30 by a bias current from a power source. The output current of the amplification circuit 51 changes depending on a current value of the bias current.

The OB clamp circuit 52 clamps a value in the after-mentioned optical black (OB) region as a reference value for black for the output signal of the amplification circuit 51.

The correlated double sampling circuit 53 includes two sample hold circuits (S, H) 53a, 53b that sample an output signal from the OB clamp circuit 52 and hold it. The sample hold circuit 53a includes a condenser Ca that charges a voltage of the output signal from the OB clamp circuit 52 and holds it. The sample hold circuit 53b includes a condenser Cb that charges a voltage of the output signal from the OB clamp circuit 52 and holds it. The condensers Ca, Cb are charged with an output current through the OB clamp circuit 52 from the amplification circuit 51.

Output terminals of the sample hold circuits 53a, 53b are connected to two input terminals of a differential amplifier 53c, respectively. The output terminal of the differential amplifier 53c is connected to the auto gain control circuit 54. The output terminal of the auto gain control circuit 54 is connected to the analog/digital conversion circuit 55. The output terminal of the analog/digital conversion circuit 55 is connected to the control unit 10.

The timing generator 56 alternately generates a pulse signal DS1 indicative of a sampling timing of the sample hold circuit 53a and a pulse signal DS2 indicative of a sampling timing of the sample hold circuit 53b. At the same time, the timing generator 56 generates a pulse signal DS3 that sets a timing to sequentially output pixel data in pixel unit from the CCD 30 according to the control by the control unit 10.

The following will explain about the operation that converts an analog video signal corresponding to a captured image to a digital video signal and stores the digital image in the flash memory 12.

By releasing an electronic shutter, light from an object to be imaged reaches a sensor face of the CCD 30 through the lens 20 and the quantity of electronic charge corresponding to brightness of the light accumulates on the sensor face for each pixel.

Figure 3:
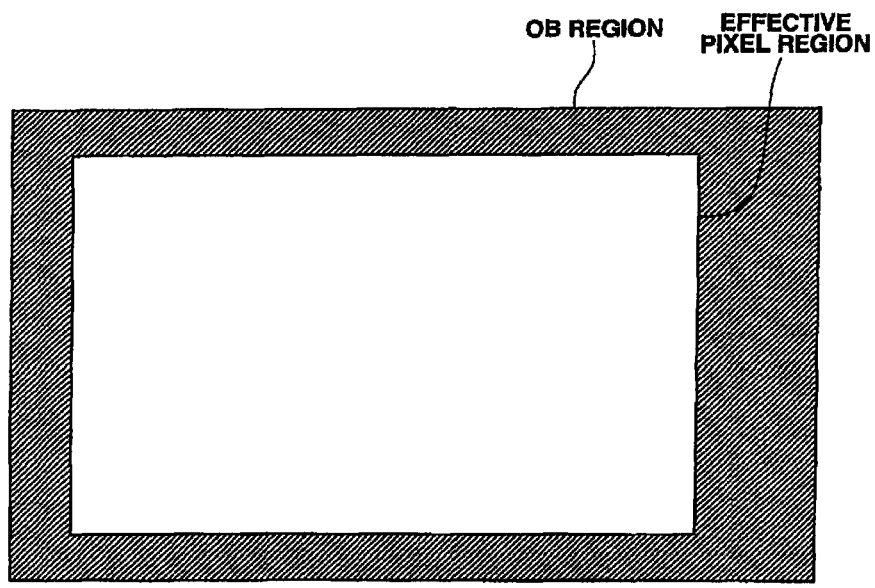
FIG. 3 is a pixel structure of a typical CCD.

FIG. 3 illustrates a pixel structure of a typical CCD.

The sensor face of the CCD 30 is typically rectangular and the outside edge portions on the left, right, top and bottom thereof compose a OB region light-shielded with Al (aluminum). The central region of the sensor face of the CCD 30 is an effective pixel region with a color filter.

Figure 4:
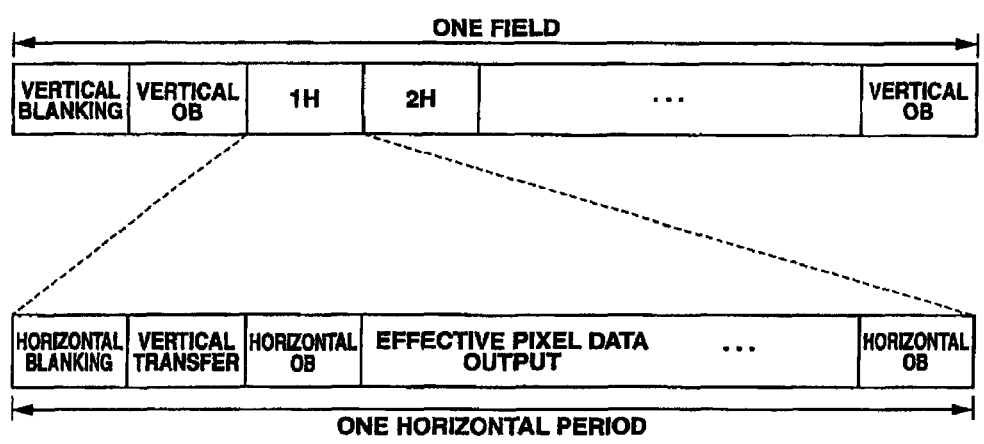
FIG. 4 is a brief illustration of timings in one field.

FIG. 4 is a brief illustration of timings in one field.

One field has: a vertical blanking interval during which the CCD 30 does not output pixel data in order to indicate the beginning of said field; a vertical OB period (vertical OB) during which the CCD 30 outputs pixel data in the OB region on the bottom end side of the sensor face thereof; a plurality of horizontal transfer periods (1H, 2H, . . . ) during each of which one line of pixel data is horizontally transferred; and a vertical OB period during which the CCD 30 outputs pixel data in the OB region on the top end side of the sensor face thereof. These periods are placed in this order in the field.

In each of the horizontal transfer periods (1H, 2H, . . . ), a horizontal blanking interval, a vertical transfer period, a horizontal OB period (horizontal OB), an effective pixel data output period (effective pixel data output) and a horizontal OB period (horizontal OB) are placed in this order.

The horizontal blanking interval is the period during which the CCD 30 does not output pixel data in order to indicate the beginning of the horizontal transfer period. The vertical transfer period is the period during which the CCD 30 vertically transfers the electric charge corresponding to pixel data to be outputted to a CCD for horizontal transfer (not shown) that the CCD 30 has.

The horizontal OB period following the vertical transfer period is the period during which the CCD 30 outputs pixel data in the OB region on the left end side of the sensor face thereof. The effective pixel data output period is the period during which horizontal effective pixel data is sequentially outputted from the CCD 30. The horizontal OB period following the effective pixel data output period is the period during which the CCD 30 outputs pixel data in the OB region on the right end side of the sensor face thereof.

For such one-field processing, the control unit 10 instructs the timing generator 56 to set timings to generate pulse signals DS1, DS2, DS3. The control unit 10 also controls the bias current flowing from the power source to the amplification circuit 51 thereby controlling the output current from the amplification circuit 51.

The timing generator 56 does not generate a pulse signal DS3 and generates only pulse signals DS1, DS2 during the vertical blanking interval, horizontal blanking interval and vertical transfer period according to the instruction from the control unit 10. During other periods, the timing generator 56 generates pulse signals DS1, DS2, DS3 at predetermined timings.

Since a pulse signal DS3 is not provided during the vertical blanking interval, horizontal blanking interval and vertical transfer period, the CCD 30 does not output an analog video signal for each pixel.

Meanwhile, since a pulse signal DS3 is provided during the vertical OB period, horizontal OB period and effective pixel data output period, the CCD 30 outputs an analog video signal for each pixel.

Figure 5:
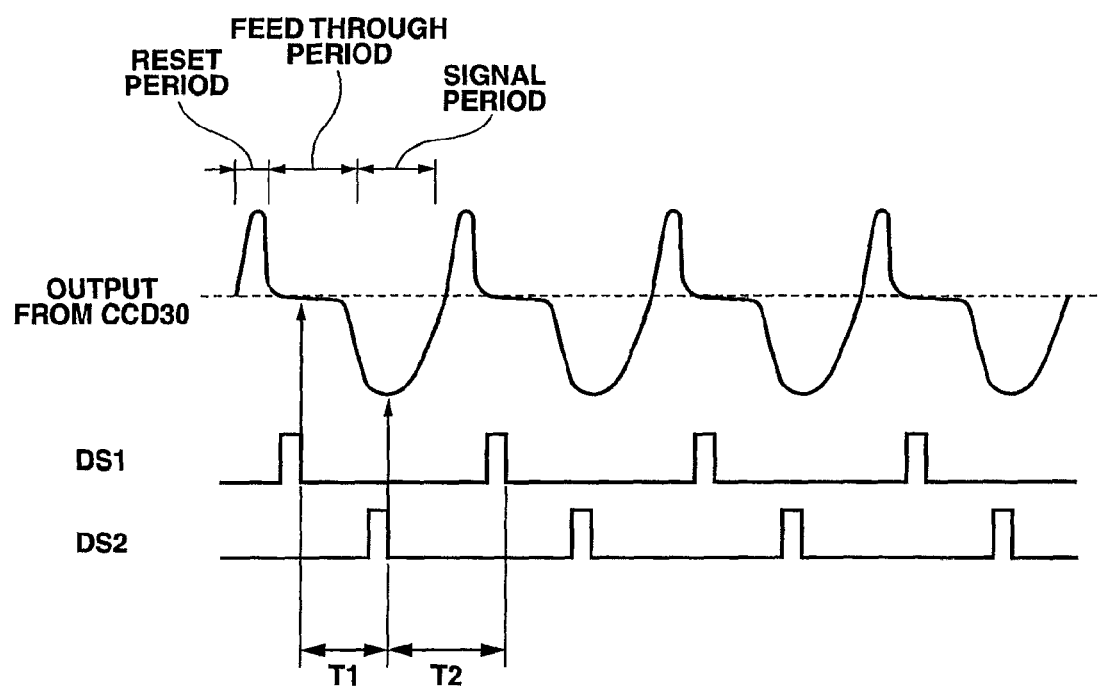
FIG. 5 is an explanatory diagram illustrating a waveform of an analog video signal outputted from a CCD and timings of pulse signals.

FIG. 5 is an explanatory diagram illustrating a waveform of an analog video signal outputted from the CCD 30 and timings of pulse signals DS1, DS2.

The analog video signal for each pixel outputted from the CCD 30 has a reset period, a feed through period and a signal period for each pixel as illustrated in FIG. 5. A level of the feed through period of the analog video signal changes to a level of the signal period depending on the quantity of electric charge accumulating for each pixel of the CCD 30. Accordingly, a difference between the level of the feed through period and the level of the signal period of the analog video signal is a voltage indicative of the quantity of electric charge accumulated by light from the object to be imaged, that is, pixel data.

The control unit 10 instructs the timing generator 56 to generate a pulse signal DS1 such that the sample hold circuit 53a samples an analog video signal and hold it during the feed through period. The control unit 10 also instructs the timing generator 56 to generate a pulse signal DS2 such that the sample hold circuit 53b samples an analog video signal and hold it during the signal period.

A difference between the levels of respective analog video signals held in the sample circuits 53a, 53b are acquired at the differential amplifier 53c, thereby becoming pixel data.

Pixel data whose difference has been acquired at the differential amplifier 53c is held constant at the auto gain control circuit 54 and converted to a digital image data by the analog/digital conversion circuit 55.

The S/N ratio of pixel data in the effective pixel region largely depends on timings to generate pulse signals DS1, DS2, which timings have an effect on the bias current flowing into the amplification circuit 51 and power consumption.

Therefore, the control unit 10 changes the timings to generate pulse signals DS1, DS2 between the vertical blanking, horizontal blanking and vertical transfer periods and other periods.

During the vertical OB period, horizontal OB period and effective pixel data output period, the control unit 10 sets the timings to generate pulse signals DS1, DS2 such that the sample hold circuits 53a, 53b sample output signals from the CCD 30 at timings that make the output signals flattest during the feed through period and signal period thereof. This can increase the S/N ratio during the vertical OB period, horizontal OB period and effective pixel data output period.

As illustrated in FIG. 5, T1 indicates a time period between a pulse signal DS1 and a pulse signal DS2 and T2 indicates a time period between the pulse signal DS2 and the next pulse signal DS1. The control unit 10 sets the timings to generate pulse signals DS1 and DS2 such that T1:T2 is 1:1 during the vertical blanking interval, horizontal blanking interval and vertical transfer period.

The bias current of the amplification circuit 51 is inversely proportional to the time period T1. This is because when the time period T1 becomes shorter, the charge time to the condenser Cb that performs sampling and holding at the sample hold circuit 53b must be shortened. As the result, the output current from the amplification circuit 51, which is the charging current of the condenser Cb, is increased by increasing the bias current of the amplification circuit 51.

Similarly, the bias current of the amplification circuit 51 is also inversely proportional to the time period T2. Here, when the cycle of an output signal of the CCD 30 is S (=T1+T2), the bias current I of the amplification circuit 51 as a function of T1, T2 is expressed by the following equation:

$$I(T1,T2)=K1/T1+K2/T2=K1/T1+K2/(S-T1)$$

where K1, K2 are proportional constants.

By differentiating I(T1, T2), it can be found that I(T1, T2) becomes the minimal value when T1=T2=2/S.

That is to say, power consumption of an imaging device can be reduced by setting the timings to generate pulse signals DS1, DS2 such that T1:T2 is 1:1 to thereby reduce the bias current.

The control unit 10 accumulates digital image data from the analog/digital conversion circuit 55 in the DRAM 11, performs processing such as removal of unnecessary data, compresses data and removes noise, and then stores the resulting data in the flash memory 12.

As described above, in the digital still camera in accordance with the present embodiment, power consumption can be reduced without stopping correlated double sampling processing among analog signal processings performed in the analog signal processing circuit 50.

In the digital still camera in accordance with the present embodiment, low power consumption is not realized by stopping the bias current supplied from a power source to the analog signal processing circuit 50. Therefore, the digital still camera in accordance with the present embodiment can prevent unstable operation of the analog signal processing unit 50 that is caused by repetitive shut-off and supply of the bias current.

Having described and illustrated the principles of this application by reference a preferred embodiment, it should be apparent that the preferred embodiment may be modified in arrangement and detail without departing from the principles disclosed herein and variations insofar as they come within the spirit and scope of the subject matter disclosed herein.

(1) In the aforementioned embodiment, the control unit 10 sets the timings to generate pulse signals DS1, DS2 such that T1:T2 is 1:1 during the vertical blanking interval, horizontal blanking interval and vertical transfer period. However, the control unit 10 also may set the timings to generate pulse signals DS1, DS2 such that T1:T2 is 1:1 during the vertical OB period and horizontal OB period.

If the timings to generate pulse signals DS1, DS2 are set such that T1:T2 is 1:1, the sample hold circuits 53a, 53b do not necessarily sample output signals from the CCD 30 at timings that make the output signals from the CCD 30 flattest during the feed through period and signal period. Accordingly the voltage held by the sample hold circuits 53a, 53b may include noise. However, since the output signals from the CCD 30 during the vertical OB period and horizontal OB period are not used as effective pixel image data, there is no problem in including noise. Therefore, by setting the timings to generate pulse signals DS1, DS2 such that T1:T2 is 1:1 during the vertical OB period and horizontal OB period, power consumption during these periods can be reduced without being affected by noise.

(2) In the aforementioned embodiment, power consumption is reduced during the process of converting an analog video signal for a captured image outputted from the CCD to a digital video signal. However, when smear components present in a vertical transfer passage of the CCD 30 and electric charge generated by the dark current is forcefully removed (high-speed sweeping), the timings to generate pulse signals DS1, DS2 may be set such that T1:T2 is 1:1.

If the timings to generate pulse signals DS1, DS2 are set such that T1:T2 is 1:1, the sample hold circuits 53a, 53b do not necessarily sample output signals from the CCD 30 at timings that make the output signals from the CCD 30 flattest during the feed through period and signal period. Accordingly the voltage held by the sample hold circuits 53a, 53b may include noise. However, since the output signals from the CCD 30 during high-speed sweeping are not used as effective pixel image data, there is no problem in including noise. Therefore, by setting the timings to generate pulse signals DS1, DS2 such that T1:T2 is 1:1 during high-speed sweeping, power consumption during high-speed sweeping can be reduced without being affected by noise.

(3) The timings to generate pulse signals DS1, DS2 may be set such that T1:T2 is 1:1 during the exposure period accompanying the push-down of a shutter button.

If the timings to generate pulse signals DS1, DS2 are set such that T1:T2 is 1:1, the sample hold circuits 53a, 53b do not necessarily sample output signals from the CCD 30 at timings that make the output signals from the CCD 30 flattest during the feed through period and signal period. However, since the CCD 30 does not output an analog video signal for each pixel during the exposure period accompanying the push-down of a shutter button, there is no problem in setting the timings to generate pulse signals DS1, DS2 such that T1:T2 is 1:1. Therefore, by setting the timings to generate pulse signals DS1, DS2 such that T1:T2 is 1:1 during the exposure period accompanying the push-down of a shutter button, power consumption during this period can be reduced without being affected by noise.

(4) A typical digital still camera has the following features: a close-up mode and an automatic mode. For example, when the shooting mode is switched from the close-up mode to the automatic mode, the CCD 30 outputs an analog video signal corresponding to the electric charge that has accumulated in the CCD 30 immediately before the switch. However, the analog video signal outputted at this time is not used as effective pixel image data after switching of the mode. Therefore, when the mode is switched from the close-up mode to the automatic mode, the timings to generate pulse signals DS1, DS2 may be set such that T1:T2 is 1:1.

If the timings to generate pulse signals DS1, DS2 are set such that T1:T2 is 1:1, the sample hold circuits 53a, 53b do not necessarily sample output signals from the CCD 30 at timings that make the output signals from the CCD 30 flattest during the feed through period and signal period. Accordingly voltage held by the sample hold circuits 53a, 53b may include noise. However, since the output signals from the CCD 30 are not used as effective pixel image data during transfer from the close-up mode to automatic mode, there is no problem in including noise. Therefore, by setting the timings to generate pulse signals DS1, DS2 such that T1:T2 is 1:1 during the exposure period accompanying the push-down of a shutter button, power consumption during transfer of the shooting mode from the close-up mode can be reduced without being affected by noise.

(5) When the timings to generate pulse signals DS1, DS2 and the bias current of the amplification circuit 51 are switched, if time is necessary for stabilizing the operation of the correlated double sampling circuit 53, the timings to generate pulse signals DS1, DS2 and timing to switch the bias current of the amplification circuit 51 may be controlled in consideration of the necessary time. For example, when the horizontal OB period transfers to the effective pixel data output period, the timing to switch the bias current may be made earlier only while the unstable operation of the correlated double sampling circuit 53 becomes stable. This prevents unstable operation of the correlated double sampling circuit 53 caused by switching the timings to generate pulse signals DS1, DS2 and the bias current of the amplification circuit 51.

What is claimed is:

1. A video signal processing circuit comprising:
    an amplifier that amplifies an analog video signal, the analog video signal being sequentially outputted in pixel unit from an imaging element depending on a driving period, a level of the analog video signal changing depending on the quantity of electric charge accumulating in a pixel;
    a timing generator that outputs a first-pulse signal and a second-pulse signal at different timings;
    a first-sample hold circuit that samples an analog video signal outputted from the amplifier at a timing when the first-pulse signal is provided and holds a level of the analog video signal;
    a second-sample hold circuit that samples an analog video signal outputted from the amplifier at a timing when the second-pulse signal is provided and holds a level of the analog video signal;
    an acquirer that acquires a difference between the level of the analog video signal held at the first-sample hold circuit and the level of the analog video signal held at the second-sample hold circuit;
    an analog/digital converter that obtains a digital video signal corresponding to the analog video signal on the basis of the difference generated by the acquirer; and
    a changer that changes the timing when the first-pulse signal is provided to the first-sample hold circuit, the timing when the second-pulse signal is provided to the second-sample hold circuit and a bias current depending on the driving period.

2. The video signal processing circuit according to claim 1 wherein the changer creates a driving period with low power consumption during which the ratio of a time period between the first-pulse signal and the second-pulse signal to a time period between this second-pulse signal and the next first-pulse signal is 1:1.

3. The video signal processing circuit according to claim 2 wherein the driving period with low power consumption includes a period during which the imaging element outputs an analog video signal of a pixel in an optical black region of a captured image.

4. The video signal processing circuit according to claim 2 wherein the driving period with low power consumption includes a period during which the imaging element outputs an unnecessary analog video signal.

5. The video signal processing circuit according to claim 1 wherein the imaging element accumulates electric charge corresponding to a captured image for each pixel, vertically transfers the electric charge for each pixel to a horizontal transfer passage, and the horizontal transfer passage outputs the analog video signal in pixel unit.

6. The video signal processing circuit according to claim 5 wherein the driving period with low power consumption includes a period during which the imaging element vertically transfers the electric charge for each pixel.

7. The video signal processing circuit according to claim 1 wherein the timing when the first-pulse signal is provided to the first-sample hold circuit, the timing when the second-pulse signal is provided to the second-sample hold circuit, and a change timing when the bias current is changed are made earlier than a timing when the driving period is switched.

8. An imaging device comprising:
a video signal processing circuit according to claim 1; and
a performer that performs a predetermined processing on an digital video signal obtained at an analog/digital converter and a recorder that records resulting data on a recording medium.

9. A video signal processing method comprising:
an amplification step to amplify an analog video signal by a bias current, the analog video signal being sequentially outputted in pixel unit from an imaging element depending on a driving period and a level of the analog video signal changing depending on a quantity of electric charge accumulating in a pixel;
a timing generation step to generate a first-pulse signal and a second-pulse signal at different timings;
a first-sample hold step to sample an analog video signal outputted at the amplification step at a timing when the first-pulse signal is provided and hold a level of the analog video signal;
a second-sample hold step to sample an analog video signal outputted at the amplification step at a timing when the second-pulse signal is provided and hold a level of the analog video signal;
an acquisition step to acquire a difference between the level of the analog video signal held at the first-sample hold step and the level of the analog video signal held at the second-sample hold step; and
an analog/digital conversion step to obtain a digital video signal corresponding to the analog video signal on the basis of the difference acquired at the acquisition step;
wherein the timing to generate the first-pulse signal, the timing to generate the second-pulse signal and the bias current are changed depending on the driving period.

* * * * *